PULSE WIDTH MODULATION SYSTEM

Filed Aug. 7, 1951

INVENTOR
Lars B.Person
BY
Charles H. Brown
ATTORNEY

United States Patent Office 2,707,268

Patented Apr. 26, 1955

2,707,268

PULSE WIDTH MODULATION SYSTEM

Lars Bernhard Person, Princeton, N. J., assignor to Radio Corporation of America, a corporation of Delaware Application August 7, 1951, Serial No. 240,683

9 Claims. (Cl. 332—9)

The invention relates to pulse width modulation systems, and it particularly pertains to a modulator circuit for modulating synchronizing pulses of a visual signal television transmitter in order to transmit both aural and visual television signals on a single carrier wave.

It has been suggested many times to modulate aural and visual television signals on the same carrier in order to reduce the band width required to give the same effective results, to simplify the equipment required, and also to reduce initial and operating costs. Several proposed schemes for accomplishing this end are described in the article entitled "Transmission of Television Sound on the Picture Carrier" in the proceedings of the IRE for February 1946, pages 49–61, by G. L. Fredendall, K. Schlesinger and A. C. Schroeder.

These schemes have not met with unanimous approval for various reasons. There is, however, one application to which such a scheme is highly advantageous. This application lies in "on the scene" televising of news and sporting events wherein the program is picked up at a remote point by the conventional television camera and microphone and relayed over a narrowcasting network to a conventional television broadcasting station. At the present time, completely separate transmitters are used to narrowcast the visual and aural television signals constituting the television program. Such an installation is, of course, expensive in both initial and operating costs and exceedingly bulky as to portability.

Accordingly, it is an object of the invention to produce an improved circuit arrangement by means of which the aural television program signal can be superimposed on the transmitted visual signal by modulating the synchronizing pulses of the latter in width.

It is another object of the invention to provide an improved pulse width modulation circuit which is simple in construction and which possesses a higher degree of linearity than heretofore found possible in the prior art.

The foregoing objects are attained according to the invention in a pulse width modulation circuit comprising a monostable multivibrator triggered by an input pulse train to regenerate a train of relatively square wave pulses in response to the input pulse train and restored in response to the amplitude of an applied intelligence signal wave. One convenient application is contemplated in a television transmitter wherein the multivibrator circuit is interposed between a source of synchronizing pulses and a mixer circuit of a visual signal television transmitter to vary the width of the synchronizing pulses in accordance with the aural signal to be transmitted while at the same time maintaining the relative time of occurrence of the leading edges of the synchronizing pulses required to perform the intended function. The circuit according to the invention is not limited to such use, however, but may be employed by one skilled in the art to modulate almost any train of pulses in width.

The invention will be described in detail with reference to the accompanying drawing forming a part of this specification and in which.

Figures 1, 2:
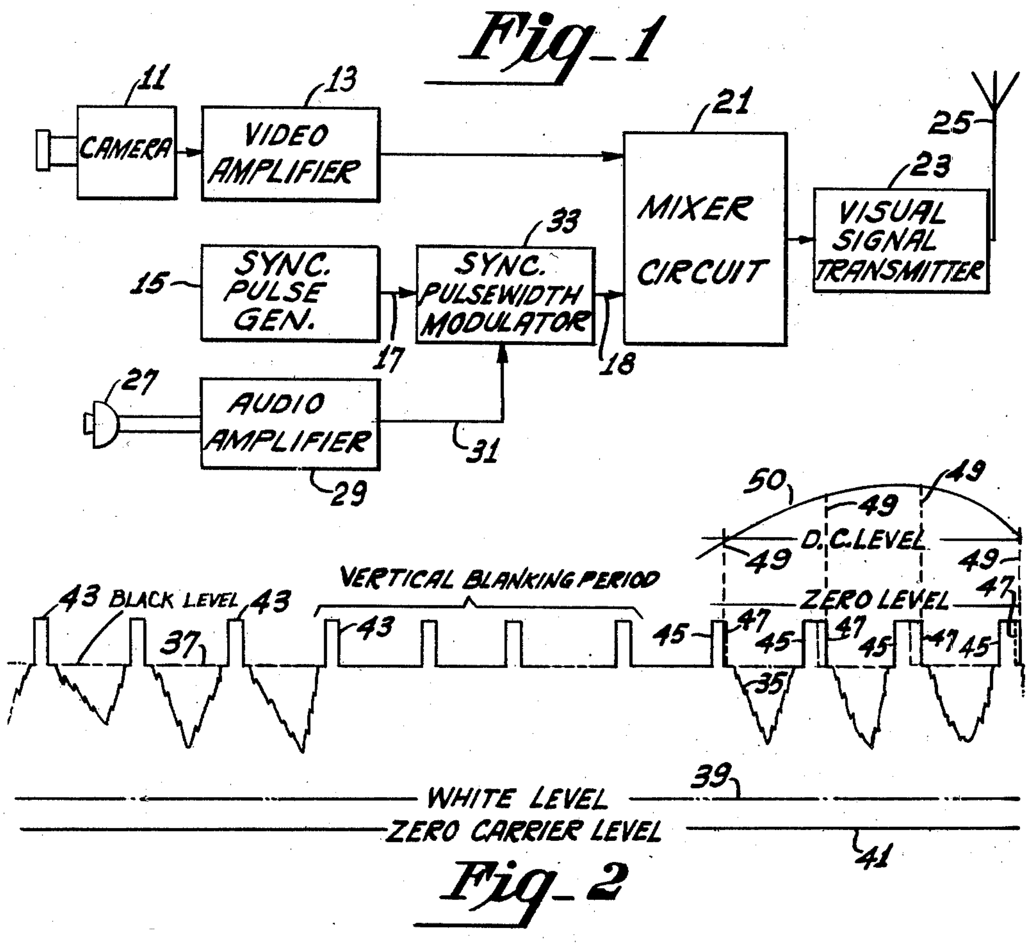
Fig. 1 is a functional diagram of a television transmitter according to the invention.
Fig. 2 is a representation of the output wave form of a television system according to the invention.

Referring to Fig. 1, there is shown a transmitter for transmitting visual signals corresponding to a television program comprising a television camera 11 connected to a video amplifier 13, the output of which is applied with the output of a synchronizing pulse generator 15 over leads 17 and 18 to a mixer circuit 21 wherein the mixed video and synchronizing signal outputs are applied to a visual signal transmitter 23 for application to an antenna 25.

The components thus described form no part of the invention themselves and may be any one of a number of such components which are known to those skilled in the art. Alternative arrangements may be used also. For example, the camera 11 may be replaced by a bank of cameras such as would be employed in color television broadcasting, and so forth. According to the invention an aural signal generated by a microphone 27 whose output is applied to an audio amplifier 29 is, in its amplified form, applied over a lead 31 to a synchronizing pulse width modulator 33 interposed in leads 17 and 18 between the synchronizing pulse generator 15 and the mixer circuit 21. Neither the microphone 27 nor the audio amplifier 29 form a part of the invention itself, and both may be of entirely conventional form.

The synchronizing pulse width modulator 33 preferably comprises a mono-stable multi-vibrator circuit including a pair of suitable electron discharge systems or other electron path devices which is triggered by a pulse train emanating from synchronizing pulse generator 15 over lead 17 to form a train of pulses the leading edges of which appear in fixed timed relationship as dictated by the synchronizing pulse generator 15. The circuit constants of the multi-vibrator circuit are such that the circuit restores itself to the stable state at some time before the succeeding synchronizing pulse arrives over lead 17 so that synchronizing pulses applied over lead 18 to mixer circuit 21 will properly modulate the carrier wave for synchronizing the visual program in the absence of any aural signal. Aural signal voltages applied over lead 31 to the synchronizing pulse width modulator 33 serve to restore the multivibrator circuit to its stable state at a time differing from the natural time of restoration after triggering of the multivibrator proportional to the amplitude of the audio signal applied.

Referring to Fig. 2 there is shown a graphical representation of the output wave form of the complete system wherein lines 35 represent the visual signals corresponding to the video portion of the television program which vary between the back level indicated by chain line 37 and the white level indicated by chain line 39 above zero voltage level indicated by the solid line 41. The wave form represented by lines 43 represent the horizontal line synchronizing pulses as they normally occur without modulation in width according to the invention. Frame synchronizing pulses and field synchronizing pulses are not necessary in the remote pickup of the broadcasting as described above, but the train of synchronizing pulses continues to appear during the vertical blanking period as shown. Synchronizing pulses modulated in width according to the invention are represented by line 45, the variation in width being indicated by the portion 47 in accordance with the instantaneous amplitude represented by dashed lines 49 of the applied audio frequency wave as represented by line 50. Fig. 2 is intended only as an aid to understanding the basic principle of the invention and is not to be considered as a rigorous analysis of the result of the novel arrangement.

At the receiving end the video and synchronizing portions of the wave form are separated for utilization in conventional manner. The synchronizing pulses are applied to conventional synchronizing circuits which are responsive to the lead edges of the synchronizing pulses to form an image on a displaying device or to trigger a synchronizing pulse regenerator for a broadcasting transmitter. Additional circuitry in the form of a pulse width discriminating circuit, of which there are many known to the art for this purpose, is required to measure the synchronizing pulses and develop an audio frequency wave for application to the audio frequency amplifier of a television receiver or the frequency modulator of a broadcasting transmitter.

Figure 3:
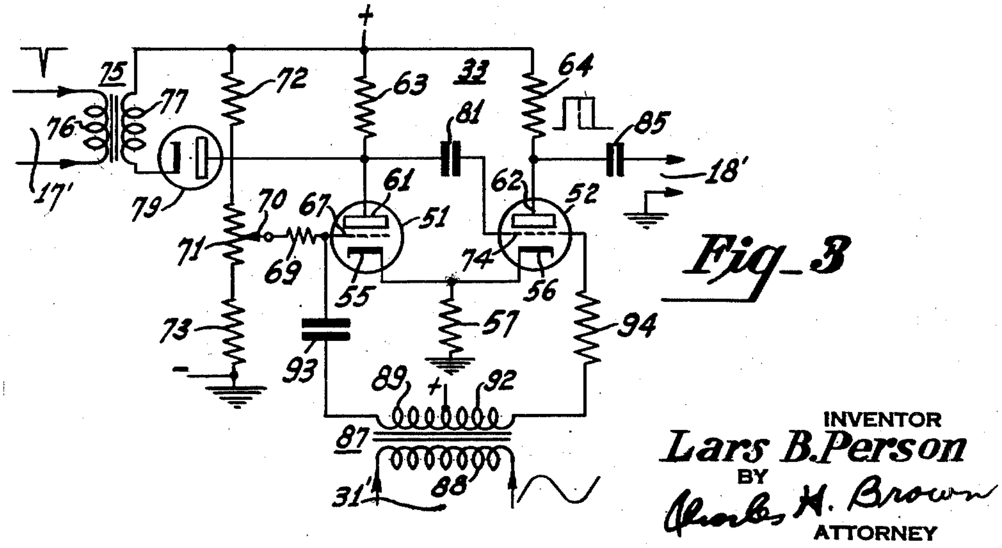
Fig. 3 is a schematic diagram of a pulse width modulator according to the invention for use in the television transmitter illustrated in Fig. 1.

Referring to Fig. 3 there is shown a preferred form of synchronizing pulse width modulator 33'. A pair of vacuum tubes 51 and 52 have the cathode electrodes 55 and 56 thereof connected to ground, or any other point of fixed reference potential desired, by means of a common cathode resistor 57. Anode electrodes 61 and 62 are connected to a source of direct operating potential (not shown) by means of resistors 63 and 64, respectively. A grid electrode 67 of the tube 51 is connected by means of a resistor 69 to the arm 70 of a potentiometer 71 connected in series with resistors 72 and 73 across the above mentioned source of direct operating potential. The arm 70 is positioned in the circuit at a point placing the grid 67 of the tube 51 sufficiently negative with respect to the cathode 55 to render tube 51 normally blocked. The grid electrode 74 of tube 52 is made slightly positive with respect to the cathode 56 by connection to a source of direct operating potential, shown here as a connection to a modulation transformer.

By means of a pulse transformer 75 to the primary winding 76 of which a pulse train is applied by means of leads 17′, negative polarity synchronizing pulses are induced in the secondary winding 77 and applied across the resistor 63 in the anode circuit of tube 51 by way of a diode element 79. In practice, element 79 is preferably constituted by a pair of germanium crystal diodes connected in series. Diode 79 is used to isolate the synchronizing pulse generator circuit 15 from the anode 61. Otherwise the connection of the transformer winding 77 between the positive potential source and anode 61 would put the latter at positive potential again just as soon as the triggering pulse had passed. This would result in an output pulse only as wide as the triggering pulse and no modulation in width would be possible. The means for coupling and isolating the multivibrator to and from the pulse generator as shown need not be exactly as shown, as there are other schemes well known to the artisan.

The application of the negative synchronizing pulses to anode 61 of tube 51 results in transfer of energy from anode 61 by way of a capacitor 81 to the grid electrode 74 of the tube 52 causing the grid 74 to drop in potential which reduces the potential at the cathode 56 of the tube. Due to this latter drop the cathode 55 of the tube 51 also drops in potential to a point where the grid 67 is sufficiently positive with respect to cathode 55 to render the tube 51 conducting. Anode 61 of the tube 51 becomes even lower in potential at this point and the multivibrator is in the unstable condition. At a time period determined by the constants of the multivibrator circuit, particularly by the product of the capacity of capacitor 81 and the resistance of resistor 94, tubes 51 and 52 will revert to their normal stable condition with the former blocked and the latter conducting. This is brought about principally by the charging of the capacitor 81 by the positive potential applied through the grid resistor 94. At the anode electrode 62 of the tube 52 a pulse whose leading edge is fixed in time relationship and whose trailing edge is determined by the time constants of the multivibrator circuit will be produced in response to the application of the triggering pulses applied over leads 17′ and translated over a coupling capacitor 85 to output leads 18′ in the absence of any audio frequency modulating potential.

According to the invention the position of the trailing edge of each output pulse is varied in time with respect to the leading edge of the pulse in accordance with the instantaneous amplitude of the audio frequency signal applied over leads 31′ to the primary winding 88 of a modulation transformer 87 wherein output voltages are developed across the secondary winding sections 89 and 92. A connection to the above mentioned source of direct operating potential is made to the common ends of the transformer secondary winding sections 89 and 92. The output voltage developed across the transformer winding section 89 is applied by way of a capacitor 93 to the grid electrode 67 of the tube 51, while the output voltage of the transformer winding section 92 is applied by way of a resistor 94 to grid electrode 74 of the tube 52. While the potentials developed in the two windings 89 and 92 are applied in instantaneously opposing polarity to the multivibrator circuit, the circuit does not operate in push-pull because the application of potentials of opposing polarity is made to tubes operating in opposing directions, and hence are effective in the same direction. The effect of the modulating voltage components is actually push-push and the circuit is perhaps better described as "double-sided." The "double-sided" arrangement is desirable but not at all necessary.

By connecting the grid resistor 94 to a source of direct potential independent of the secondary winding section 92, the circuit will modulate the applied pulse train but will do so only at the expense of some non-linearity. Modulation can also be effected by connecting the grid capacitor 93 to ground independently of the other winding section 89 and the direct potential source but only at the expense of even more non-linearity in a direction opposite to that just mentioned. Hence, the "double-sided" arrangement provides greater linearity than is obtainable with any "single-sided" arrangement. Because the individual modulating components tend to add in effect, a wider modulation swing is obtained. This increases the efficiency of the overall system from the narrowcast transmittter to the broadcast receiver.

The voltage required in each section depends on the circuit constants of the multivibrator. In actually constructed circuits the ratio of modulating voltages required of sections 89 and 92 varied from 2:1 to 4:1 or more, respectively. That is 2 to 4 times the amplitude of wave is required from section 92 as from section 89. Since not too many ratios are available in standard transformers, it is suggested that a single secondary winding can be used with a potentiometer of suitable resistance value shunted thereacross and the direct operating potential applied at a point determined by moving the arm of the potentiometer to obtain optimum linearity of modulation. Other schemes for obtaining the proper ratio will no doubt be suggested to those skilled in the art.

In a circuit arrangement actually constructed and tested as shown in Fig. 3 the following component values are employed:

| Ref. Numeral | Component | Value or Identification |
|---|---|---|
| 51, 52 | Triode Tube | ½ 12AU7. |
| 57 | Resistor | 5.1 Kilohms. |
| 63 | do | 20 Kilohms. |
| 64 | do | 5.1 Kilohms. |
| 69 | do | 100 Kilohms. |
| 71 | Potentiometer | 10 Kilohms. |
| 72 | Resistor | 4.7 Kilohms. |
| 73 | do | 51 Kilohms. |
| 75 | Pulse Input Transformer. | 1:1 primary to secondary ratio. |
| 79 | Diode | 2-1N34 in series. |
| 81 | Capacitor | 42 $\mu\mu$fd. |
| 87 | Modulation Transformer. | 4:1 ratio between secondary winding sections. |
| 93 | Capacitor | 0.1 $\mu$fd. |
| 94 | Resistor | 500 Kilohms. |

The following potentials were developed between ground and the point indicated:

| | Volts |
|---|---|
| Cathodes 55–56 | 44 |
| Anode 61 | 153 |
| Anode 62 | 111 |
| Grid 67 | 20.7 |
| Grid 74 | 44.4 |

The invention claimed is:

1. A pulse width modulator circuit arrangement including a pair of electron discharge systems each having cathode, control and anode electrodes, an impedance element connecting the cathode electrodes of both of said systems to a point of fixed reference potential, load impedance elements individually connected to the anode electrodes of said discharge systems, a capacitor intercoupling the anode electrode of one of said systems to the control electrode of the other of said discharge systems, a resistance network having one terminal at said point of fixed reference potential and a tapping connected to the control electrode of said one discharge system, a pulse input circuit coupled across the load impedance element connected to the anode electrode of said one discharge system, low frequency input transformer having two secondary winding sections, a capacitor coupling one of said secondary winding sections to the control electrode of said one discharge system and a resistor connecting the other of said secondary winding sections to the control electrode of the other discharge system, the potentials applied by the connections to said control electrodes being of opposing polarity to act in the same direction with respect to the operation of said discharge systems.

2. A pulse width modulator circuit arrangement including a pair of electron discharge systems each having cathode, control and anode electrodes, an impedance element connecting the cathode electrodes of both of said systems to a point of fixed reference potential, load impedance elements individually connected to the anode electrodes of said discharge systems, a capacitor intercoupling the anode electrode of one of said systems to the control electrode of the other of said discharge systems, a resistance network having one terminal at said point of fixed reference potential and a tapping connected to the control electrode of said one discharge system, a pulse input circuit coupled across the load impedance element of said one discharge system, an audio frequency input circuit having means to produce two modulating waves of different amplitude in response to an applied wave, a capacitor coupled to said means to apply one of said modulating waves to the control electrode of said one discharge system, and a resistor connected to said means to apply the other of said waves to the control electrode of the other discharge system in opposite polarity to the application of the first wave to said one discharge system.

3. A pulse width modulator circuit arrangement including a pair of electron discharge systems each having cathode, control and anode electrodes, a resistor connecting the cathode electrodes of both of said systems to a point of fixed reference potential, resistors individually connected to the anode electrodes of said discharge systems, a capacitor intercoupling the anode electrode of one of said systems to the control electrode of the other of said discharge systems, a resistance network having one terminal at said point of fixed reference potential and a tapping connected to the control electrode of said one discharge system, a pulse transformer having primary and secondary windings, a diode element, said secondary winding and said diode element being connected in series across that resistor connected to the anode electrode of said one discharge system, an audio frequency transformer having a primary winding and a tapped secondary winding, a capacitor coupling one end of said secondary winding of said audio transformer to the control electrode of said one discharge system and a resistor connecting the other end of said secondary winding of said audio transformer to the control electrode of the other discharge system.

4. A pulse width modulator circuit arrangement including a pair of electron discharge systems each having cathode, control and anode electrodes, a resistor connecting the cathode electrodes of both of said systems to a point of fixed reference potential, resistors individually connected to the anode electrodes of said discharge systems, a capacitor intercoupling the anode electrode of one of said systems to the control electrode of the other of said discharge systems, a potentiometer network having one terminal at said point of fixed reference potential and a tapping connected to the control electrode of said one discharge system, a pulse input transformer having primary and secondary windings, a diode element, said secondary winding and said diode element being connected in series across that resisistor which is connected to the anode electrode of said one discharge system, an audio frequency input transformer having a primary winding and a secondary winding having two unequal sections, a capacitor coupling one end of one of said secondary winding sections to the control electrode of said one discharge system, a resistor connecting one end of the other of said secondary winding sections to the control electrode of the other discharge system to apply a potential thereto of instantaneous polarity opposite to that applied to the control electrode of said one discharge system, and means to apply operating potentials to said circuit arrangement.

5. A pulse width modulator circuit arrangement including a pair of electron discharge systems each having cathode, control and anode electrodes, a resistor connecting the cathode electrodes of both of said systems to a point of fixed reference potential, anode resistors individually connected to the anode electrodes of said discharge systems, a capacitor intercoupling the anode electrode of one of said systems to the control electrode of the other of said discharge systems, a potentiometer network having one terminal at said point of fixed reference potential and a variable tapping connected to the control electrode of said one discharge system, a resistor interposed in said connections, a pulse input transformer having primary and secondary windings, a diode element, said secondary winding and said diode element being connected in series across that resistor which is connected to the anode electrode of said one discharge system, an audio frequency input transformer having a primary winding and a double section secondary winding, the secondary winding sections having a different number of turns, a capacitor coupling one end of said secondary winding of said audio transformer to the control electrode of said one discharge system and a resistor connecting the other end of said secondary winding of said audio transformer to the control electrode of said other discharge system, means to apply the positive pole of a direct operating potential to said anode resistors, said potentiometer network and each section of the secondary winding of said audio input transformer, and a capacitor connected to the anode electrode of said other discharge system for obtaining an output voltage therefrom.

6. A pulse width modulator circuit arrangement including a pair of controlled electron path devices each having emitter, input and output electrodes, an impedance element connecting the emitter electrodes of both of said devices to a point of fixed reference potential, impedance elements individually connected to the output electrodes of said devices, a reactance element intercoupling the output electrode of one of said devices to the input electrode of the other of said devices, a fixed bias producing network connected to the input electrode of said one device, a pulse input circuit coupled to one electrode of said one device, a modulating wave input transformer having two secondary winding sections, means coupling one of said secondary winding sections to the input electrode of said one device and connecting the other of said secondary winding sections to the input electrode of the other device, the potentials applied by the connections to said input electrodes being of opposing polarity to act in the same direction with respect to the operation of both of said controlled electron path devices.

7. A pulse width modulator circuit arrangement including a pair of controlled electron path devices each having emitter, input and output electrodes, an impedance element connecting the emitter electrodes of both of said devices to a point of fixed reference potential, load impedance elements individually connected to the output electrodes of said devices, a capacitor intercoupling the output electrode of one of said devices to the input electrode of the other of said devices, a resistance network having one terminal at said point of fixed reference potential and a tapping connected to the input electrode of said one device, a pulse input circuit coupled across the load impedance element connected to one electrode of said one device, a low frequency input transformer having two secondary winding sections, means coupling said secondary winding sections individually to electrodes of said devices in polarity at which said devices are triggered to act in the same direction with respect to the operation of both of said controlled electron path devices.

8. A pulse width modulator circuit arrangement including a pair of electron discharge systems each having cathode, control and anode electrodes, an impedance element connecting the cathode electrodes of both of said systems to a point of fixed reference potential, load impedance elements individually connected to the anode electrodes of said discharge systems, an alternating current passing impedance element intercoupling the anode electrode of one of said systems to the control electrode of the other of said discharge systems, means to maintain the control electrode of said one discharge system at a predetermined value positive with respect to said point of fixed potential, a pulse input circuit coupled across the load impedance element connected to the anode electrode of said one discharge system, a low frequency input transformer having two secondary winding sections, and means coupling said secondary winding sections to the control electrodes of said discharge systems in opposing polarity to act in the same direction with respect to the operation of both of said electron discharge systems.

9. A pulse width modulator circuit arrangement including a pair of electron discharge systems each having cathode, control and anode electrodes, an impedance element connecting the cathode electrodes of both of said systems to a point of fixed reference potential, load impedance elements individually connected to the anode electrodes of said discharge systems, a capacitor intercoupling the anode electrode of one of said systems to the control electrode of the other of said discharge systems, means to maintain the control electrode of said one discharge system at a value positive with respect to said point of fixed reference potential, a pulse input circuit coupled to at least one electrode of said one discharge system, a low frequency input transformer having two secondary winding sections, means connecting one of said secondary winding sections to the control electrode of said one discharge system, and further means connecting the other of said secondary winding sections to the control electrode of the other discharge system, the potentials applied by the connections to said control electrodes being of opposing polarity to act in the same direction with respect to the operation of both of said discharge systems.

References Cited in the file of this patent

UNITED STATES PATENTS

| | | |
|---|---|---|
| 2,451,347 | McShan | Oct. 12, 1948 |
| 2,550,821 | Kharbanda | May 1, 1951 |

OTHER REFERENCES

"Transmission of Television Sound on the Picture Carrier," by Frendendall et al., pages 49 to 61 of Proceedings of I. R. E., February 1946.